May 19, 1942. A. C. LINDGREN ET AL 2,283,377
TRACTOR-ATTACHED IMPLEMENT
Filed Sept. 25, 1940
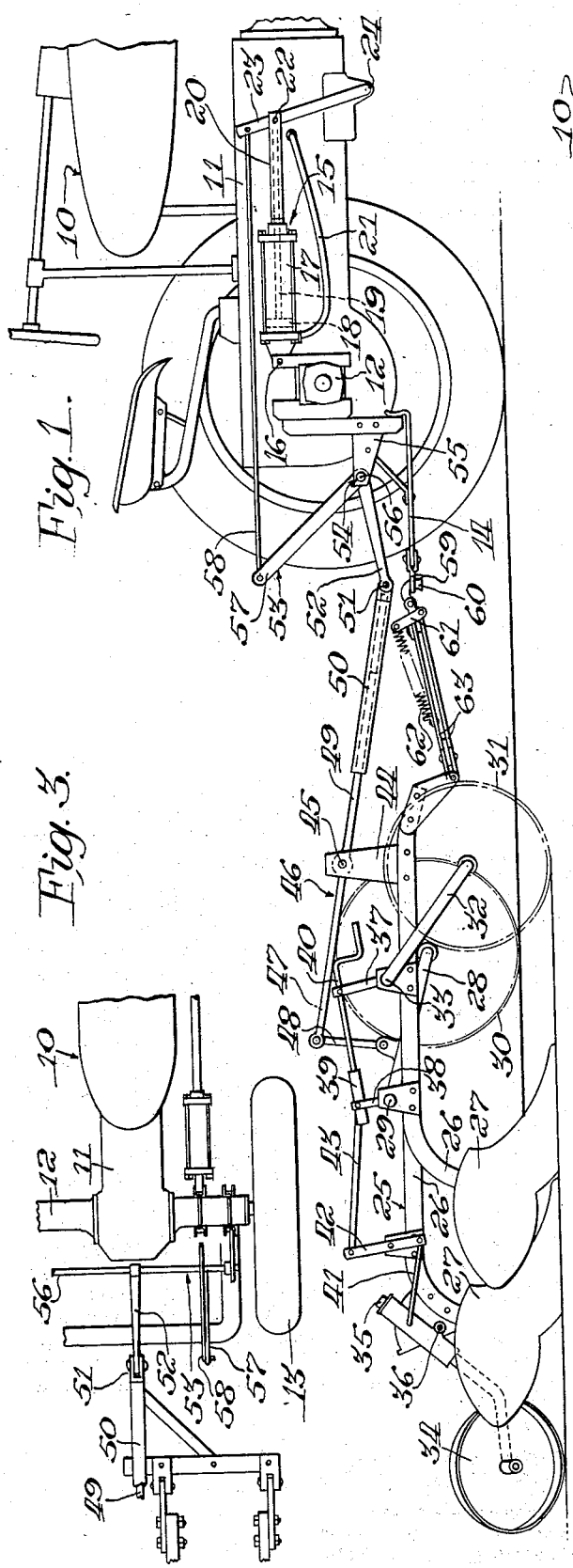
Inventors
Alexus C. Lindgren,
and Carl W. Mott
By Paul O. Pippel
Atty.

Patented May 19, 1942

2,283,377

UNITED STATES PATENT OFFICE 2,283,377

TRACTOR-ATTACHED IMPLEMENT

Alexus C. Lindgren, Cherry Valley, and Carl W. Mott, La Grange, Ill., assignors to International Harvester Company, a corporation of New Jersey Application September 25, 1940, Serial No. 358,251

20 Claims. (Cl. 97—50)

This invention relates to tractor-attached implements. More specifically it relates to the control of implements attached in trail-behind position to a tractor by means on the tractor.

In general, implements attached in trail-behind relationship to a tractor have been raised to and from ground-engaging position by a power lift on the implements. The difficulty in the adjustment of trail-behind implements through tractor power or through means on the tractor has been to transmit the necessary force for the adjustment of the implement from the tractor to the implement when the implement either pivotally and/or releasably is connected to the tractor. The purpose of the present invention is to overcome these difficulties.

An object of the present invention is to provide an improved mode of adjusting an implement trailing behind the tractor.

Another object is the provision of an improved means for adjusting an implement pivotally connected at the rear of the tractor by means on the tractor.

A further object is to provide a way of controlling a trail-behind implement by means of a power plant forming part of the tractor pulling the implement.

Still another object is the provision of a way of adjusting an implement from a tractor when the implement is releasably connected at the rear of the tractor.

Other objects will appear from the disclosure.

According to the present invention, a plow is releasably and pivotally connected in trail-behind relationship to the rear of a tractor. The plow is raised by means of a fluid-power device on the tractor through a connection between the power device and the plow which pivots with pivoting of the implement with respect to the tractor and releases with the release of the implement from the tractor.

In the drawing:

Figure 1 is a side view showing a plow in ground-working position connected at the rear of a tractor in accordance with the present invention;

Figure 2 is a view similar to Figure 1 showing the plow in raised position; and

Figure 3 is a plan view showing a portion of the tractor and the connections between the tractor and the plow.

As shown in Figures 1 and 2, a tractor 10 has a body portion 11, rear axle 12, rear wheels 13, of which only one is shown, and a U-shaped draw-bar 14 secured to the tractor. A fluid-power device 15 is connected at 16 to the side of the tractor. This device is of the type shown in the patent to Lindgren, 2,156,570, May 2, 1939, and comprises essentially a cylinder 17, a piston 18 slidably mounted in the cylinder, a rod 19 extending from the piston, and a sleeve 20 embracing the rod 19. A hose 21 supplies fluid under pressure to the device 15 and causes the piston 18 to be moved to the right of the cylinder and also the sleeve 20 which is pivotally connected at 22 to an arm 23 pivotally mounted at its lower end at 24 to the underside of the tractor body 11.

Positioned at the rear of the tractor in trail-behind relationship thereto is a plow 25 composed of a frame formed of beams 26 and plow elements 27. A crank axle 28 is pivotally connected at one end to the plow frame at 29 and carries at its other end a land wheel 30. A front furrow wheel 31 is connected to the plow by means of a crank axle 32 pivotally connected at 33 to the plow frame. A rear furrow wheel 34 is connected by means of a crank axle 35 pivotally connected at 36 to the plow frame. The front wheels are adjustably interconnected by arms 37 and 38 secured to crank axles 32 and 28, respectively, and by means of a sleeve 39 and the rod 40 threaded thereinto. A link 41 connects the crank axle 35 and one end of a lever 42, having its other end connected to the arm 37 by means of a link 43. At the front end of the plow frame is a standard 44 to which is pivotally connected as at 45 a midpoint of the lever 46. The rear end 47 of the lever is connected to the crank axle 28 by means of a link 48. The front end 49 of the lever is embraced by a sleeve 50 which is in turn connected in a universal joint 51 to an arm 52. The arm 52 is part of rockable means 53 mounted at the rear of the tractor on a transverse axis 54 on brackets 55 connected to the rear axle 12. As seen in Figure 1, the arm 52 extends rearwardly horizontally in the ground-engaging position of the plow 25. As seen in Figure 3, the rockable means 53 comprises beside the arm 52 a shaft 56 mounted coaxially with the transverse axis 54 and a generally upwardly extending arm 57 connected to the arm 23 by means of a link 58.

The implement is releasably connected to the tractor draw-bar 14 by a hitch substantially as shown in the patent to Young, 2,185,454, January 2, 1940. The hitch comprises essentially a clevis 59 secured to the draw-bar, a draft hook 60 releasably held against pivoting by means of a toggle 61 controlled by a spring 62. The draft hook, spring, and toggle are carried on bars 63 pivotally connected at their rear end to the plow

25. The action of this hitch is such than when there is an overload upon the draft connection, occasioned for example by the encountering of an obstruction by the plow, the spring and toggle allow the hook 60 to swing out of engagement with the clevis 59, and the plow is released from the tractor. At the same time, the end 49 of the lever 46 slides out of the clevis, and there is, accordingly, a release of the connection between the power device 15 on the tractor and the implements.

During normal operation of the plow 25, it occupies the position shown in Figure 1. When it is desired to raise the plow for transporting, the power device 15 is actuated so that the piston 18 moves to the right of the cylinder 17. As a consequence, the arm 23 moves to the right and causes the rockable means 53 to rotate in a clockwise direction. As a result, the arm 52 is raised. This causes a raising of the end 49 of the lever 46 and the lowering of the other end 47. The lowering of the crank axle 28 follows, and, consequently, the resultant lowering of the wheels of the plow with respect to the plow frame causes a raising of the plow elements 27 out of the ground.

It will be observed from Figure 3 that the universal joint 51 forming the connection between the arm 52 and the sleeve 50 slidably engaging the lever 46 is substantially above the clevis 59 and the draft hook 60 which constitute the pivot connection between the tractor and the plow. Thus, when he tractor is turned, the pivoting of the tractor with respect to the plow, does not disturb the connection between the power device 15 and the plow, since the universal joint 51 permits the necessary movement.

It will be noted from Figure 1 that when the plow is in ground-engaging position the universal joint 51 is quite close to the clevis 59 and the draft hook 60, so that any pivotal movement of the plow with respect to the tractor in vertical plane as may result from rises or depressions in the ground has no effect upon the depth of the plow elements 27. It is true that in the transport position the universal joint is considerably removed from the clevis and the draft hook 60, but any shifting of the plow elements because of rises or falls in the ground is unimportant in transport position.

It will be seen from Figure 3 that the rockable means 53 with its upwardly extending arm 51 in longitudinal alinement with the power device 15 at the side of the tractor, and the rearwardly extending arm 52 on the center of the line of the tractor permits the necessary shifting in the application of the force from the tractor to the implement from the side of the tractor to the central line of the tractor.

It has been possible to employ relatively slidable parts releasable from one another such as the sleeve 50 and the lever 46 for transmitting the force from the tractor to the plow for raising the same, because the force is transmitted through these parts, not in the direction in which they slide relative to one another and release, but in a vertical direction which is at a substantial angle to the direction of sliding.

It is the intention to limit the invention only within the scope of the appended claims.

What is claimed is:

1. In combination, a tractor having a power plant, an implement positioned in trail-behind relationship to the tractor, means forming a pivotal connection between the implement and the rear of the tractor, a rockable member mounted at the rear of the tractor so as to have a vertical movement in a portion substantially in vertical alinement with the pivot connection of the implement with the tractor, means connecting the tractor power plant and the rockable means, and means connecting the said portion of the rockable member and the implement for causing vertical movement of the said portion to effect adjustment of the implement.

2. The combination specified in claim 1, the means connecting the rockable member and the implement being associated with the rockable member in a joint permitting vertical and horizontal movement.

3. In combination, a tractor having a power plant provided with an outlet at the side of the tractor, an implement positioned in trail-behind relationship to the tractor, means forming a pivotal connection between the implement and a point at the rear of the tractor displaced laterally from the power-plant outlet, and means for adjusting the implement comprising rockable means mounted on the tractor so as to have a vertical movement in a portion substantially in vertical alinement with the pivot connection of the implement with the tractor, means connecting the power-plant outlet and the rockable means, and means connecting the implement and the said portion of the rockable means.

4. The combination specified in claim 3, the means connecting the rockable member and the implement being associated with the rockable member in a joint permitting vertical and horizontal movement.

5. In combination, a tractor having a power plant and a power device positioned at the side of the tractor and composed of a cylinder element and a piston element having relative movement produced by the power plant, an implement positioned in trail-behind relationship to the tractor, means forming a pivotal connection between the implement and a point at the rear of the tractor displaced laterally from the power-plant outlet, and means for adjusting the implement comprising rockable means mounted on the tractor so as to have a vertical movement in a portion substantially in vertical alinement with the pivot connection of the implement with the tractor, means connecting the power device and the rockable means, and means connecting the implement and the said portion of the rockable means.

6. In combination, a tractor having a power plant, an implement positioned in trail-behind relationship to the tractor, means forming a pivotal connection between the implement and the rear of the tractor, and means for adjusting the implement comprising rockable means mounted on the tractor on a transverse axis forward of the pivotal connection of the tractor and the implement and having a portion generally over the said pivotal connection adapted to have vertical movement by rocking of the rockable means, means connecting the said portion of the rockable means and the implement, and being associated with the said portion of the rockable means in a universal connection, and means connecting the rockable means and the tractor power plant for causing rocking of the rockable means.

7. In combination, a tractor, an implement positioned in trail-behind relationship to the tractor and comprising a frame and a crank axle pivotally connected thereto for vertical adjustment of the implement, means forming a pivotal connection between the implement and the rear of the tractor, and means for effecting vertical adjustment of the implement comprising rockable means mounted on the tractor on a transverse axis forward of the pivotal connection and having a portion extending generally over the pivotal connection so as to have vertical movement toward and away from the pivotal connection upon rocking of the rockable means, lever means pivotally mounted on the implement for vertical movement, means connecting the crank axle and the lever means, and means connecting the lever means and the said portion of the rockable means.

8. The combination specified in claim 7 and further including a power plant on the tractor, and means connecting the power plant and the rockable means for rocking the same.

9. The combination specified in claim 7, the means connecting the said portion of the rockable means and the crank axle on the implement being associated with the said portion in a connection permitting relative vertical and horizontal movement between the means and the said portion.

10. In combination, a tractor having a power plant, an implement positioned in trail-behind relationship to the tractor and comprising a frame and a crank axle pivotally connected thereto for vertical adjustment of the implement, means forming a pivotal connection between the implement and the rear of the tractor, and means for effecting vertical adjustment of the implement comprising rockable means mounted on the tractor on a transverse axis forward of the pivotal connection and having a portion extending generally over the pivotal connection so as to have vertical movement toward and away from the pivotal connection upon rocking of the rockable means, lever means pivotally mounted on the implement for vertical movement, means connecting the crank axle and the lever means, means connecting the lever means and the said portion of the rockable means, and being associated with the said portion in a connection permitting relative vertical and horizontal movement between the means and the said portion, and means connecting the tractor power plant and the rockable means for rocking the same.

11. In combination, a tractor having a power plant, an implement positioned in trail-behind relationship to the tractor and comprising a frame and a crank axle pivotally connected to the frame for effecting vertical adjustment thereof, means forming a pivotal connection between the implement and the rear of the tractor, a rockable member pivotally mounted on the tractor on a transverse axis forward of the pivotal connection and having a first arm extending generally upward from the transverse axis and a second arm extending generally horizontally rearwardly over the pivotal connection, a lever pivotally mounted between its ends for movement in a vertical plane on the frame, means connecting one end of the lever and the crank axle, means connecting the other end of the lever and the horizontally extending arm of the rockable member, and means connecting the tractor power plant and the upwardly extending arm of the rockable member.

12. The combination specified in claim 11, the means connecting the said other end of the lever on the implement frame and the horizontally extending arm of the rockable member providing relative vertical and horizontal movement between the lever and the arm.

13. The combination specified in claim 11, the said other end of the lever being composed of slidably connected sections.

14. In combination, a tractor, a plow positioned in trail-behind relationship to the tractor and comprising a frame, a plow element secured thereto, and a crank axle pivotally connected to the frame for raising the frame and the plow element, means forming a pivotal connection between the plow and the rear of the tractor, rockable means mounted on the tractor and having a portion generally over the pivotal connection adapted to have vertical movement toward and away from the pivotal connection with rocking of the rockable means, a lever pivotally mounted between its ends on the plow frame for vertical movement, means connecting one end of the lever and the crank axle, and means connecting the other end of the lever and the said portion of the rockable means, whereby with the plow frame in lowered working position the end of the lever connected to the crank axle is relatively high and the end of the lever connected to the said portion of the rockable means is low with the said portion close to the pivotal connection of the plow and the tractor so that in working position there is no change in height of the plow frame because of relative movement of the plow and tractor about the pivotal connection.

15. In combination, a tractor, an implement positioned in trail-behind relationship to the tractor, means forming a connection releasable under overload between the implement and the tractor, and means for adjusting the implement comprising force-receiving means mounted on the tractor and means connecting the implement and the force-receiving means and being releasable upon release of the connection between the tractor and the implement, said connecting means including parts associated so as to be relatively slidable in the general direction of draft between tractor and implement and conjointly movable at a substantial angle to the direction of draft for adjustment of the implement.

16. In combination, a tractor, an implement positioned in trail-behind relationship to the tractor, means forming a connection releasable under overload between the implement and the tractor, and means for adjusting the implement comprising rockable force-receiving means mounted on the tractor for movement in a plane at a substantial angle to the line of draft between tractor and implement, and means connecting the force-receiving means and the implement and including relatively slidably associated parts constituting a release for the connecting means effective upon release of the connection between the tractor and the implement.

17. In combination, a tractor, an implement positioned in trail-behind relationship to the tractor, means forming a connection releasable under overload between the implement and the tractor, and means for adjusting the implement comprising rockable force-receiving means mounted on the tractor for movement in a plane at a substantial angle to the line of draft between tractor and implement, and a lever mounted on the implement and extending generally in the direction of the line of draft and comprising slidably engaged parts, one being connected to the rockable means and the other to the implement, the parts sliding out of engagement with one another upon release of the connection between the tractor and the implement.

18. In combination, a tractor, an implement positioned in trail-behind relationship to the tractor, means forming a connection releasable under overload between the implement and the tractor, and means for adjusting the implement comprising rockable force-receiving means mounted on the tractor on a transverse axis and having a portion extending substantially rearwardly from the axis and having vertical movement upon rocking of the means, a lever pivotally mounted between its ends on the implement for movement in a vertical plane generally in the line of draft between tractor and implement and having one end connected with the implement, and a sleeve slidably embracing the other end of the lever and connected to the said portion of the rockable means.

19. In combination, a tractor, an implement positioned in trail-behind relationship to the tractor, hitch means pivotally connected at its rear end to the implement and connected at its front end to the tractor for release under overload, and means for adjusting the implement comprising force-receiving means mounted on the tractor, and means extending between the force-receiving means and the implement and having a pivotal connection with the force-receiving means and being releasable at a section to the rear of the pivotal connection upon release of the releasable connection between the hitch means and the tractor.

20. In combination, a tractor having a power plant, an implement positioned in trail-behind relationship to the tractor, means forming a pivotal connection between the implement and the rear of the tractor, means for adjusting the implement comprising rockable means mounted on the tractor on a transverse axis forward of the pivotal connection of the tractor and the implement and having a portion generally over the said pivotal connection adapted to have vertical movement by rocking of the rockable means and connecting the said portion of the rockable means and the implement, and means connecting the rockable means and the power plant for causing the power plant to effect rocking of the rockable means.

ALEXUS C. LINDGREN.
CARL W. MOTT.